INVENTORS.
WILLIAM R. MURRAY,
WILLIAM O. MURRAY,
BY
Berman, Davidson & Berman
ATTORNEYS.

June 4, 1968  W. R. MURRAY ETAL  3,386,550
AUTOMATIC ELECTRONIC MICROWAVE COOKING AND VENDING MACHINE
Filed Nov. 15, 1966  8 Sheets-Sheet 2

INVENTORS.
WILLIAM R. MURRAY,
WILLIAM O. MURRAY,
BY
Berman, Davidson & Berman
ATTORNEYS.

June 4, 1968   W. R. MURRAY ETAL   3,386,550
AUTOMATIC ELECTRONIC MICROWAVE COOKING AND VENDING MACHINE
Filed Nov. 15, 1966   8 Sheets-Sheet 5

FIG. 7.

INVENTORS:
WILLIAM R. MURRAY,
WILLIAM O. MURRAY,
BY
Berman, Davidson & Berman
ATTORNEYS.

FIG. 14.

INVENTORS.
WILLIAM R. MURRAY,
WILLIAM O. MURRAY,
BY

Berman, Davidson & Berman
ATTORNEYS.

United States Patent Office 3,386,550
Patented June 4, 1968

3,386,550
AUTOMATIC ELECTRONIC MICROWAVE
COOKING AND VENDING MACHINE
William R. Murray and William O. Murray, both of
P.O. Box 88, Frankford, Del. 19945
Filed Nov. 15, 1966, Ser. No. 594,582
24 Claims. (Cl. 194—10)

This invention relates to automatic food cooking and dispensing machines, and more particularly to a coin-controlled machine for selectively dispensing cooked food products, such as a selected meat dish and a plurality of selected vegetable dishes, whereby to enable a customer to obtain the ingredients of the main course of a meal without requiring the services of a waiter or other attendant.

A main object of the invention is to provide a novel and improved automatic coin-controlled dispensing machine for vending cooked food products, such as cooked meat dishes and cooked vegetable dishes, the machine being relatively simple in construction, providing storage space for holding an adequate supply of partially pre-cooked foods to be subsequently dispensed, and being provided with easily-accessible and reliable means to enable a customer to make a selection of desired food articles to be dispensed, for example, to select a desired meat dish and a plurality of desired vegetable dishes, according to his choice.

A further object of the invention is to provide an automatic food cooking and dispensing machine of improved construction which involves relatively inexpensive components, which requires a minimum amount of maintenance, and which incorporates means for cooking selected food articles in accordance with the specific articles selected and in accordance with the time required to complete the cooking of the articles so that when they are dispensed they will be completely cooked, and will be ready for consumption.

A still further object of the invention is to provide an improved automatic coin-controlled dispensing machine for serving cooked food articles, the machine being provided with storage means for keeping a supply of frozen or with storage means for keeping a supply of frozen or pre-cooked food articles stored in the machine for future delivery, the machine being further provided with conveyor means arranged to contain a supply of various different partially pre-cooked food articles, said conveyor means being selectively actuated in accordance with the customer's choice, the selected food articles being carried through the machine and through a timed cooking oven which completes the cooking of the articles, in accordance with the articles selected, after which the completely cooked articles are delivered to the customer in a condition ready for consumption.

A still further object of the invention is to provide an improved automatic cooking and vending machine for enabling a customer to select various food articles, for example, a meat dish and a plurality of vegetable dishes, the machine being arranged to deliver the selected food articles to the customer after said articles have been properly cooked in the machine, the machine being provided with means to store frozen or partially pre-cooked articles prior to their delivery to a customer and being further provided with sufficient capacity to incorporate a wide range of selections of combinations of meat and vegetable dishes.

A still further object of the invention is to provide an improved automatic food cooking and vending machine which enables food articles to be cooked and dispensed without requiring contact with human hands, whereby the food articles are delivered with the minimum risk of contamination, the machine being easy to keep in a clean and sanitary condition, being reliable in operation, and providing a wide range of choices of food articles or combinations thereof.

Further objects and advantages of the invention will become apparent from the following description and claims, and from the accompanying drawings, wherein:

FIGURE 14 is a wiring diagram showing the remaining portion of the electrical circuit associated with the machine of FIGURES 1 to 12, and showing the elements associated with the vegetable-food-article side of the machine.

Referring to the drawings, 15 generally designates an improved coin-controlled automatic food cooker and dispenser constructed in accordance with the present invention. The dispenser 11 comprises a main food-storage cabinet 16 which includes refrigeration means for maintaining the interior thereof at a sufficiently low temperature to prevent deterioration of the food articles contained therein, presently to be described. Designated at 17 is the front wall or front partition associated with the machine, the machine being located in a space 18 behind said front wall 17. The front wall 17 is provided with a food-delivery window 19 having an inwardly-swingable transparent closure panel 20, arranged in a manner presently to be described, the window 19 representing the point of delivery of the selected food articles dispensed by the machine.

Mounted on the wall 17 adjacent to the delivery window 19 is a control panel 21 on which is mounted the conventional coin-receiving device 22, a row of meat-selecting push buttons 23, a vegetable-selecting control knob 24, a vegetable-delivery push button 26, respective signal lamps 27 and 28, presently to be described, and a coin-return chute 29.

Figures 1, 2:
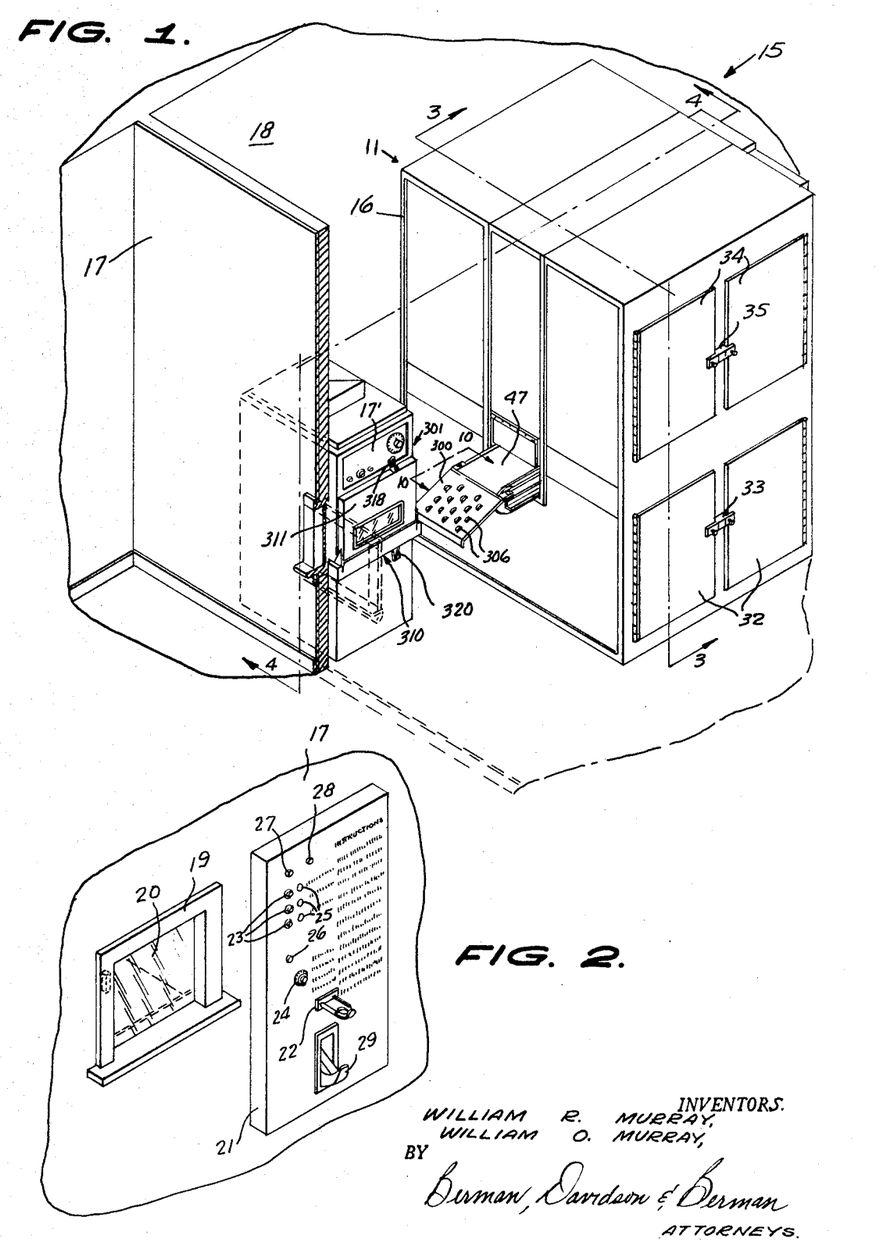
FIGURE 1 is a perspective view of an improved automatic food cooking and vending machine constructed in accordance with the present invention.
FIGURE 2 is an enlarged fragmentary perspective view of a portion of the front wall of the machine of FIGURE 1, including the control panel and coin-receiving portion thereof and the food-delivery window.

The cabinet 16 is generally rectangular in shape and comprises an upper working space 30 and a bottom storage space 31. The bottom storage space 31 is provided for the purpose of storing food articles to be subsequently dispensed after those provided in the upper working space 30 have become depleted. Access to the bottom storage space 31 is provided by means of doors 32 in the lower portions of the sidewalls of the cabinet, said doors being provided with suitable latch assemblies 33, as shown. Access to the working space 30 is obtained by the provision of similar doors 34 in the upper portions of the sidewalls of the cabinet, said doors having suitable latch assemblies 35, as shown. As shown in FIGURE 1, the doors 32 and 34 are hinged on vertical axes located near respective front and rear corner portions of cabinet 16, as viewed in FIGURE 1.

Figure 3:
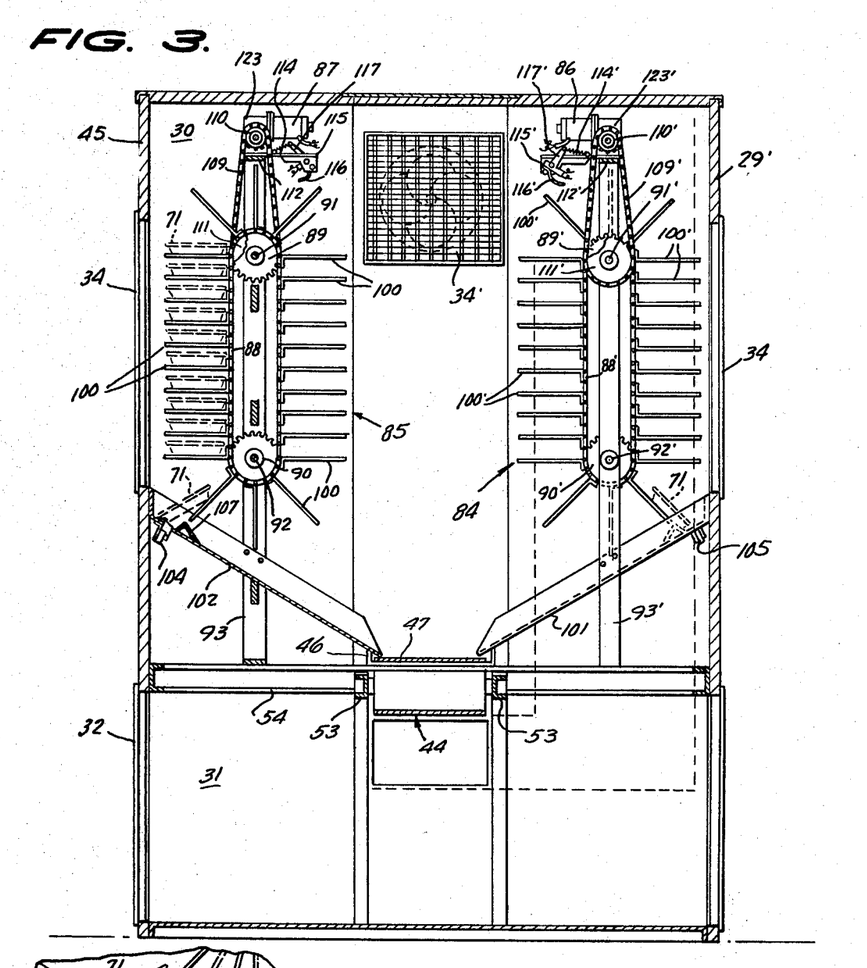
FIGURE 3 is an enlarged transverse vertical cross-sectional view taken through the machine substantially on the line 3—3 of FIGURE 1.

The cabinet 16 and the contents thereof are similar in construction to that disclosed in our previously filed application Serial No. 494,156, filed October 10, 1965, and entitled, "Electronic Microwave Cooking and Vending Machine" and which issued as Patent No. 3,333,666 on Aug. 1, 1967. Thus, the cabinet 16 is provided with the upper and lower doors 34 and 32 on the opposite sides thereof to provide access to the upper and lower spaces 30 and 31 from the respective opposite sides of the cabinet. The cabinet 16 is provided with refrigeration means comprising a conventional refrigeration compressor 33' which furnishes compressed and cold refrigerant to a cooling unit 34' mounted at the upper portion of the rear wall 35 of the cabinet, the cooling unit being disposed in a duct 36 extending through rear wall 35. A fan housing 37 is mounted over the duct in the manner illustrated in FIGURE 4, the housing containing a blower fan 38 arranged to force air through the cooling unit 34 and into the top portion of the cabinet 16. The air is delivered through return duct 39 which communicates with a return register 40 provided in the lower portion of the rear wall 35 so that air is circulated through the cabinet, being forced through the cooling unit 34' by the fan 38 and returning to the housing 37 through the return register 40 and the return duct 39. The compressor 33' is driven by a suitable electric motor 41 (see FIGURE 14), the motor being controlled by a conventional thermostatic switch 42 provided in the cabinet 16, whereby the compressor is energized when the temperature in the cabinet rises above a predetermined safe value, thus insuring adequate and continuous refrigeration inside the cabinet and thus preventing deterioration of the food articles stored therein. Air is continuously circulated through the cabinet by the blower fan 38, the blower fan being provided with a driving motor 43. The thermostatic switch 42 may be located in any suitable portion of the interior of the cabinet, for example, in the upper portion of the working space 30 thereof.

A longitudinally-extending belt conveyor assembly, designated generally at 44, is mounted horizontally and substantially centrally in the cabinet 16, being located substantially midway between the sidewalls 29' and 45 of the cabinet, as shown in FIGURE 3. The belt conveyor 44 extends forwardly through an aperture 73 in the forward vertical wall 74 of cabinet 16. The belt conveyor includes a stationary upwardly-facing channel-shaped top guide member 46 and an endless belt 47 whose top run is supported on the guide member 46, as shown in FIGURE 3. The endless belt 47 is driven in a counterclockwise direction, as viewed in FIGURE 4, by an electric motor 48 through a suitable gear-reduction unit 49 and a sprocket-drive assembly comprising a sprocket chain 50 engaged with sprockets provided respectively on the output shaft of the gear-reduction assembly 49 and the belt roller shaft 51 at the left end of the endless belt 47, as viewed in FIGURE 4. The right end belt roller shaft 52 is adjustably supported in the horizontally-extending belt-conveyor frame bars 53, 53 which, in turn, form part of the rigid framework of the machine as described in our previously filed application Serial No. 494,156. Thus, said rigid framework includes transversely-extending horizontal frame bars 54 which are rigidly-secured to the longitudinally-extending belt conveyor-supporting frame bars 53, 53, as shown in FIGURE 3. The right end transverse belt roller-supporting shaft 52 is supported in suitable bearing blocks 55 which are slidably-mounted in longitudinal slots 56 provided in the bars 53 and which are adjustably-positioned by means of abutment screws 57 so that the belt 47 may be adjusted to a desired degree of tightness.

Figure 4:
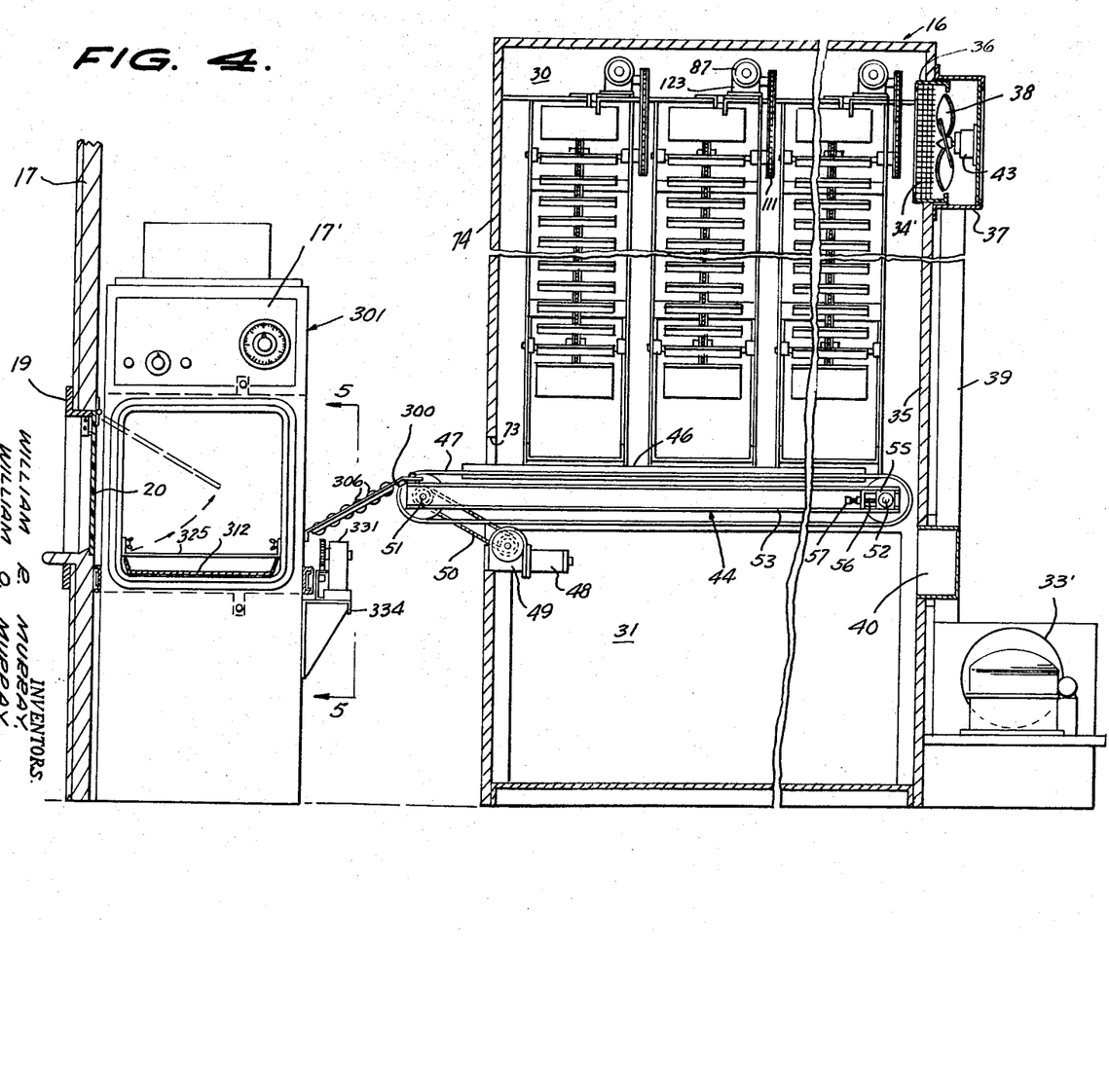
FIGURE 4 is an enlarged longitudinal vertical cross-sectional view taken through the machine substantially on the line 4—4 of FIGURE 1.
Figures 10, 11, 12:
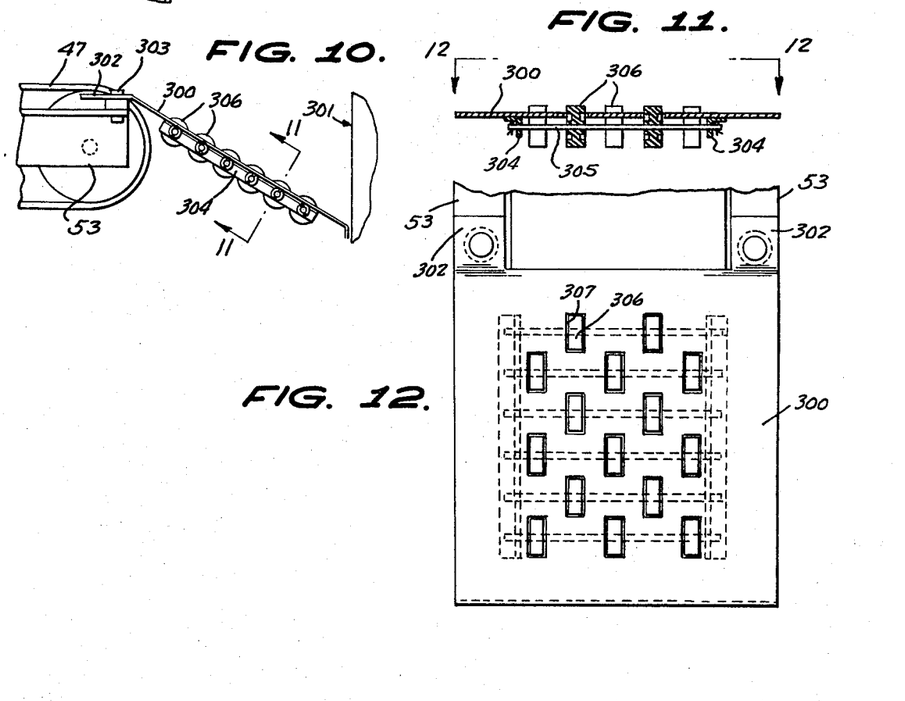
FIGURE 10 is an enlarged fragmentary side elevational view of the inclined tray-guiding ramp element and portions adjacent thereto, as employed in the machine, said view being taken substantially on the line 10—10 of FIGURE 1.
FIGURE 11 is a cross-sectional detail view taken substantially on the line 11—11 of FIGURE 10.
FIGURE 12 is a fragmentary top plan view taken substantially on the line 12—12 of FIGURE 11.

Designated at 300 is a downwardly and forwardly-inclined transfer plate which extends from the left end of the top run of belt 47 toward an oven unit 301, presently to be described, as shown in FIGURE 4. The transfer plate 300 is provided at its upper corners with apertured attachment tabs or lugs 302, 302 which are respectively secured to the forward ends of the top flanges of the frame bars 53, 53, as by bolts 303, as shown in FIGURE 10. The downwardly and forwardly-inclined transfer plate 300 is provided with depending parallel spaced bracket bars 304, 304 in which are supported a plurality of transversely-extending spaced parallel roller rods 305 on which are journaled the conveyor rollers 306 whose upper portions extend through and are freely-rotatable in slots 307 formed in the transfer plate 300, as shown in FIGURE 12. Thus, food trays delivered onto the downwardly and forwardly-inclined transfer plate 300 from the top run of endless belt 47 will slide freely down the transfer plate toward the oven unit 301.

As will be presently described, tray-like receptacles 71 containing food articles are adapted to be conveyed on the initial conveyor-belt assembly 44 to the transfer plate 300 for reception in and cooking by the oven unit 301.

Mounted in the left side of the cabinet 16, as viewed in FIGURE 3, are a plurality of vertical conveyors 85, for example, four vertical conveyors as disclosed in our previously filed patent application Ser. No. 494,156, adapted to contain the partly-cooked vegetable dishes and to ultimately deliver the selected vegetable dishes to the central conveyor belt 47 in a manner presently to be described. Mounted in the right-side portion of the cabinet 16 are a plurality of additional vertical conveyors 84, for example, three vertical conveyors 84, adapted to contain respective partially-cooked meat dishes and arranged to ultimately deliver selected meat dishes to the central belt 47 in a manner presently to be described.

The vertical conveyors 85 comprise respective sprocket chains 88 engaged around top and bottom sprocket wheels 89 and 90 mounted centrally on respective horizontal shafts 91 and 92 which are journaled in respective vertical frames 93 fixedly-secured in the upper portion of cabinet 16, the upper shafts 91 having respective sprockets 111 secured to their outer ends, the sprockets 111 being drivingly-coupled by sprocket chains 109 to sprocket wheels 110 secured on the output shafts of gear-reduction units 123. The respective drive motors 87 drive said sprockets 111 through the gear-reduction units 123. The drive motors 87 associated with the respective vertical conveyors 85 and their associated gear-reduction units 123 are mounted on a horizontally-extending supporting bar 112 rigidly-secured in and extending longitudinally through the top portion of cabinet 16 at the left side thereof, as viewed in FIGURE 3.

As described in our previously filed patent application Ser. No. 494,156, the sprocket chains are provided with suitable link brackets and attachment means supporting respective tray-supporting shelves 100. Thus, the shelf or platform elements 100 are supported in outwardly-projecting positions by the chains 88. Trays 71 containing partly-cooked vegetable items are disposed on the leftward shelf elements 100, as viewed in FIGURE 3, to be ultimately delivered to downwardly and forwardly-inclined delivery troughs 102 provided beneath the respective vertical conveyors 85, said delivery troughs being rigidly-mounted in the cabinet 16 below the vertical conveyors 85 and terminating over the left marginal portions of the top run of conveyor belt 47, as viewed in FIGURE 3.

Figure 3A:
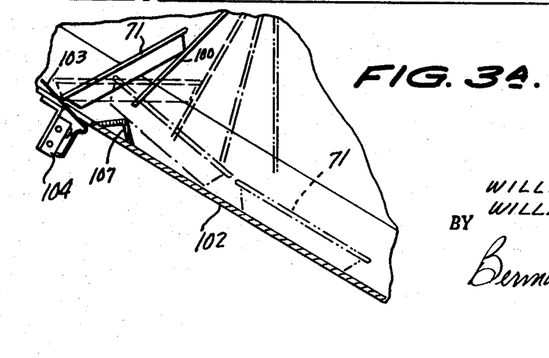
FIGURE 3A is an enlarged fragmentary cross-sectional view showing the upper portion of one of the food-article-delivery troughs of the machine and illustrating the manner in which a selected dish of food drops onto the delivery trough and is guided thereby toward the delivery belt of the machine.

As shown in FIGURE 3A, the lowermost tray 71 is normally supported in an inclined position on its associated shelf element 100, the bottom end of the tray element engaging the operating arm 103 of a microswitch 104 provided at the upper end of the associated inclined delivery trough 102, thereby keeping the microswitch 104 closed as long as a loaded tray 71 is present. As will be presently described, in the absence of a tray element 71, the associated drive motor is disabled.

A transversely-extending abutment rib 107 is provided at the top portion of each delivery trough 102, said abutment rib extending adjacent the bottom edge of the nearest platform element 100, under normal conditions. When the associated chain 88 is driven by its motor 87, the platform elements 100 move counterclockwise, as viewed in FIGURE 3, and as viewed in FIGURE 3A, allowing the lowermost tray 71 to rotate over the generally triangular-shaped abutment rib 107 in the manner shown in dotted view in FIGURE 3A, the tray member being released for downward sliding movement on the inclined delivery trough 102 as its associated supporting shelf element 100 continues its counterclockwise rotation, as viewed in FIGURE 3A. As will be presently described, each conveyor motor 87, when energized, operates for a timed period, sufficient to release the lowermost vegetable tray 71.

Mounted in the right side of the cabinet 16, as viewed in FIGURE 3, are a plurality of vertical meat-item conveyors 84, for example, three such vertical conveyors, which are generally similar in construction to the conveyors 85, except that the platform elements 100' thereof are each connected at their opposite ends to sprocket chains 88' engaged over the top and bottom sprocket wheels 89' and 90' mounted on respective horizontal shafts 91' and 92' journaled in vertical frames 93' rigidly-secured in the right-side portion of cabinet 16. The shafts 91' are driven by sprocket chains 109' connecting sprockets 111' on shafts 91' to sprockets 110' on the output shafts of reduction units 123' associated with drive motors 86. The drive motors 86 and their associated reduction units 123' are mounted on a longitudinally-extending supporting bar 112' fixedly-secured in the top right portion of cabinet 16, as viewed in FIGURE 3.

The partly-cooked meat items are disposed on the rightward platform elements 100' of the associated vertical meat-item conveyors 84, the lowermost tray 71 of each conveyor normally engaging the operating element of a microswitch 105 provided at the top portion of a respective downwardly and inwardly-inclined receiving trough 101 provided beneath each vertical conveyor 84. As in the case of each microswitch 104, the microswitches 105 are normally kept closed by the presence of a loaded tray 71 engaged thereagainst.

As previously mentioned, respective doors 34 are provided in the wall 29', whereby access is obtained to the vertical conveyors 84 for loading same. Similarly, doors 34 are also provided at the left side of cabinet 16, as viewed in FIGURE 3, thereby providing access to the vertical conveyors 85 for loading same.

The upper ends of the receiving troughs 101 are provided with transversely-extending abutment members 107 similar to those provided at the upper portions of the receiving troughs 102 and providing the same type of movement of the meat trays, as above-explained, responsive to the clockwise movement of the lowermost platform element 100', as viewed in FIGURE 3, as the motor 86 of the associated meat conveyor 84 is energized. The clockwise movement of the lowermost shelf element 100' allows the meat tray engaged thereby to be released and to rotate over the subjacent abutment member 107 and thereafter, slide downwardly along the subjacent receiving trough 101, to be eventually delivered to the top run of conveyor belt 47.

The motor support bar 112 associated with the vertical vegetable-tray conveyors 85 has secured thereon respective horizontally-extending arms 114 to the ends of which are secured microswitches 115 having operating arms 116 depending in the path of movement of the outer edges of the support shelf elements 100, whereby the microswitch assemblies 115 are operated responsive to the counterclockwise rotation of the upper right shelf members 100, as viewed in FIGURE 3, causing the associated motors 87 to be de-energized, in a manner presently to be described. Similarly, the motor support bar 112' associated with the meat-tray conveyors 84 is provided with horizontally-extending arms 114' carrying microswitches 115' provided with bottom operating arms 116' extending in the path of movement of the edges of the platform members 100' so that the switches 116' are operated responsive to the clockwise rotation of the upper left shelf elements 100', as viewed in FIGURE 3. As will be presently described, this de-energizes the motors 86.

The switches 115 and 115' may comprise switch assemblies of the mercury type pivotally-mounted on their associated supporting arms 114 and 114'. The switches may be mounted in any manner, for example, in the manner described in detail in our previously filed application Ser. No. 494,156, above-mentioned. Thus, each switch may include a pivotal supporting body 117 pivoted to a depending vertical flange provided on the associated supporting bar 114 or 114'. The lower end of the pivoted body is formed with the operating arm 116 or 116' which is engaged by the outer edges of the shelf elements 100 or 100' as said shelf elements move therepast in accordance with the movements of the associated sprocket chains 88 or 88'. For example, the lower end of the pivoted body 117 associated with the shelf elements 100 has the operating arm 116 which is engaged by the outer edge of a shelf element 100 as said shelf element moves counterclockwise therepast, as viewed in FIGURE 3, in accordance with the movement of the associated sprocket chain 88, thereby causing the associated switch-supporting body 117 to rotate clockwise, as viewed in FIGURE 3, against the biasing force of an associated coiled spring connecting the top end of the body 117 to the secured inner portion of the associated arm 114.

The mercury switches 115 and 115' are normally closed, as will be presently explained, but are opened responsive to the swinging movements of their associated arms 117 caused by the engagement of the rotating shelf elements 100 or 100' with the actuating arm portions 116 and 116' of the bodies 117. Under normal conditions, the coiled springs associated with the bodies 117 hold said bodies in positions in which the associated switches 115 and 115' are closed.

Figure 13:
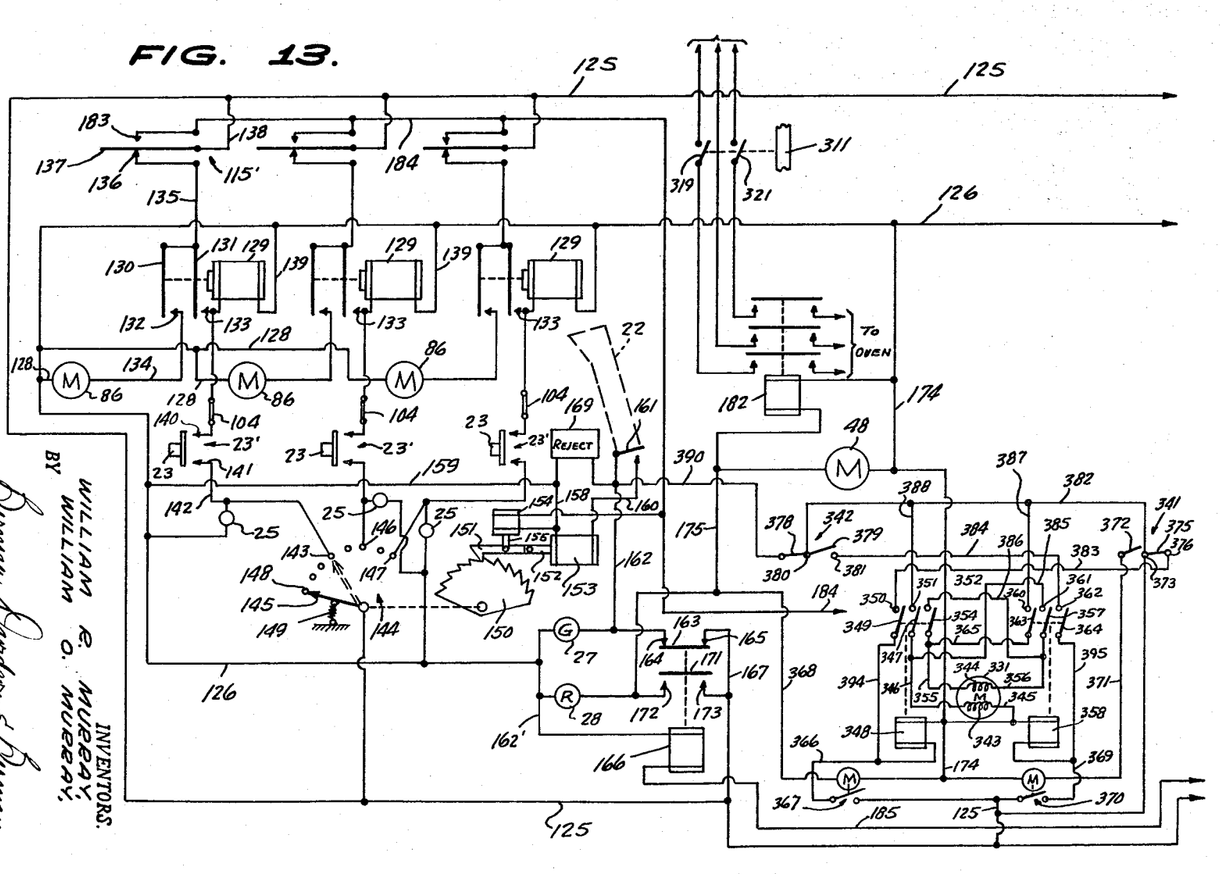
FIGURE 13 is a wiring diagram showing the electrical connections of a part of the electrical circuit associated with the machine of FIGURES 1 to 12, namely, the circuitry associated with the meat-article side of the machine.

The switch assemblies 115' associated with the vertical conveyors 84 operate in the same manner as the switch assemblies 115 associated with the vertical conveyors 85, except that the switches 115' are arranged as single-pole, double-throw switches, whereas, the switches 115 are arranged as single-pole, single-throw switches, as shown in FIGURES 13 and 14, for a purpose presently to be described.

Obviously, conventional mechanically-operating microswitches may be employed instead of switches of the mercury type.

The machine is provided with a control box 17' containing most of the electrical control devices associated with the apparatus. Referring to FIGURES 13 and 14, it will be seen that the electrical components are energized from a pair of line wires 125 and 126. Thus, the motor 41 of the refrigeration compressor unit 33' has one terminal thereof connected to the line wire 126, as by wire 127, and has the other terminal thereof connected to line wire 125 through the thermoswitch 42. The fan motor 43 is likewise connected across the line wires 126 and 125. Each of the meat dish-conveyor motors 86 has one terminal thereof connected to the line wire 126, for example, by respective wires 128. The other terminals of the meat conveyor motors 86 are connected to the line wire 125 through the contacts of the respective relays 129 and their associated limit switches 115'. Thus, each relay 129 is provided with two poles 130 and 131 and with associated stationary contacts 132 and 133. The terminal wire 134 of each motor is connected to a stationary contact 132, and its relay pole 130 is connected by a wire 135 to the lower contact 136 of the associated limit switch 115'. The pole 137 of said limit switch is connected by a wire 138 to line wire 125. The relay pole 131 is connected to wire 135 and the stationary contact 133 is connected to one terminal of the winding of the relay 129, the opposite terminal of said winding being connected by a wire 139 to the line wire 126. Relay contact 133 is connected through the associated product exhaust-indicating switch 104 to one stationary contact 140 of the associated meat dish-selecting push-button switch 23' associated with a meat dish-selecting push-button 23. The remaining stationary contact 141 of the push-button switch is connected by a wire 142 to a stationary contact 143 of a ratchet-operated rotary switch 144 having a rotary switch pole 145 connected to line wire 125. This comprises the control circuit for the first motor 86.

The second meat dish conveyor motor 86 has a similar control circuit including a relay 129 whose stationary contact 133 is connected through another push-button switch 23' to a further stationary contact 146 of the ratchet-operated rotary switch 144, spaced one or more steps in a clockwise direction from the first-named contact 143. The third meat dish conveyor motor 86 is similarly provided with an energizing circuit controlled by a relay 129 whose stationary contact 133 is connected through its product exhaust-operated switch 104 and its selecting push-button switch 23' to still another stationary contact 147 of the ratchet-operated rotary switch 144, spaced in a clockwise direction, as viewed in FIGURE 13, from the previously-mentioned stationary contact 146. The pole 145 is biased in any suitable manner, for example, by a spring 149, to an initial starting position wherein said pole 145 engages a first stationary contact 148. The pole 145 is drivingly-connected to a ratchet disc sector 150 which is actuated in stepped fashion by a pawl member 151 pivotally-connected to the plunger 152 of a ratchet solenoid 153. A ratchet-release solenoid 154 has its plunger 155 pivotally-connected to the pawl 151, whereby to disengage the pawl 151 from ratchet sector 150 responsive to the energization of the release solenoid 154.

Each time the solenoid 153 is energized it retracts the pawl member 151 a sufficient distance to rotate the sector 150 clockwise through one step, as viewed in FIGURE 13, causing the switch pole 145 to similarly rotate to a corresponding angular step, the step corresponding to the angular spacing between the stationary contacts of the rotary switch assembly 144. In a typical arrangement illustrated schematically in FIGURE 13, four successive steps of energization of the ratchet solenoid 153 will bring the pole 145 from its starting position into engagement with the stationary contact 143. Two more steps of energization of the ratchet solenoid 153 will move the pole 145 into engagement with the stationary contact 146, and two more further steps of energization of the ratchet solenoid 153 will bring the pole 145 into engagement with the stationary contact 147.

One terminal of ratchet solenoid 153 is connected by wires 158 and 159 to line wire 126. The remaining terminal of solenoid 153 is connected through a wire 160 and a coin-operated switch 161 to wire 162. The wire 162 is connected through the pole 163 and contacts 164 and 165 of a normally de-energized timing relay 166 to wire 167 which is, in turn, connected to line wire 125.

The coin-controlled switch 161 is of conventional construction and is actuated by the insertion of a proper coin in the coin-receiving member 22 and subsequent reciprocation of the actuating element of the coin-receiving member. The switch 161 is provided with conventional coin-rejecting means, such as the conventional reject mechanism designated generally at 169, connected across and energized from the wires 162 and 159.

A pilot lamp 27 is connected between wire 126 and wire 162, said lamp 27 being thus energized as long as the relay pole 163 engages contacts 164 and 165, since wire 162 is connected to wire 125 through said pole 163 and contacts 164 and 165 and the wire 167. Pilot lamp 27, which may be colored green, is thus normally energized, indicating that the machine is in a starting condition, ready for operation. The relay 166 is provided wth another pole 171 mechanically-coupled to the pole 163 and moving into bridging engagement with stationary contacts 172 and 173 responsive to the energization of relay 166, simultaneously causing pole 163 to disengage from contacts 164 and 165. Relay 166 is of a conventional latched type which latches responsive to monetary energization thereof and maintains its latched condition for a predetermined period of time. Thus, when relay 166 is momentarily energized, pole 171 moves into engagement with contacts 172 and 173 and pole 163 disengages from contacts 164 and 165, this condition being maintained for a predetermined time, after which the poles resume their normal condition, shown in full-line view in FIGURE 13, wherein pole 163 bridges contacts 164 and 165 and pole 171 is disengaged from contacts 172 and 173.

The conveyor motor 48 has one terminal thereof connected to a wire 174 which is, in turn, connected to line wire 126. The remaining terminal of motor 48 is connected to a wire 175 which is, in turn, connected to relay contact 172. Relay contact 173 is connected to the wire 167, and thence, to the line wire 125, whereby energization of relay 166 causes motor 48 to become energized through a circuit comprising line wire 126, wire 174, the motor 48, wire 175, contact 172, relay pole 171, contact 173, wire 167 and line wire 125. Motor 48 remains energized for a period of time corresponding to the latching time of the relay 166.

Figure 7:
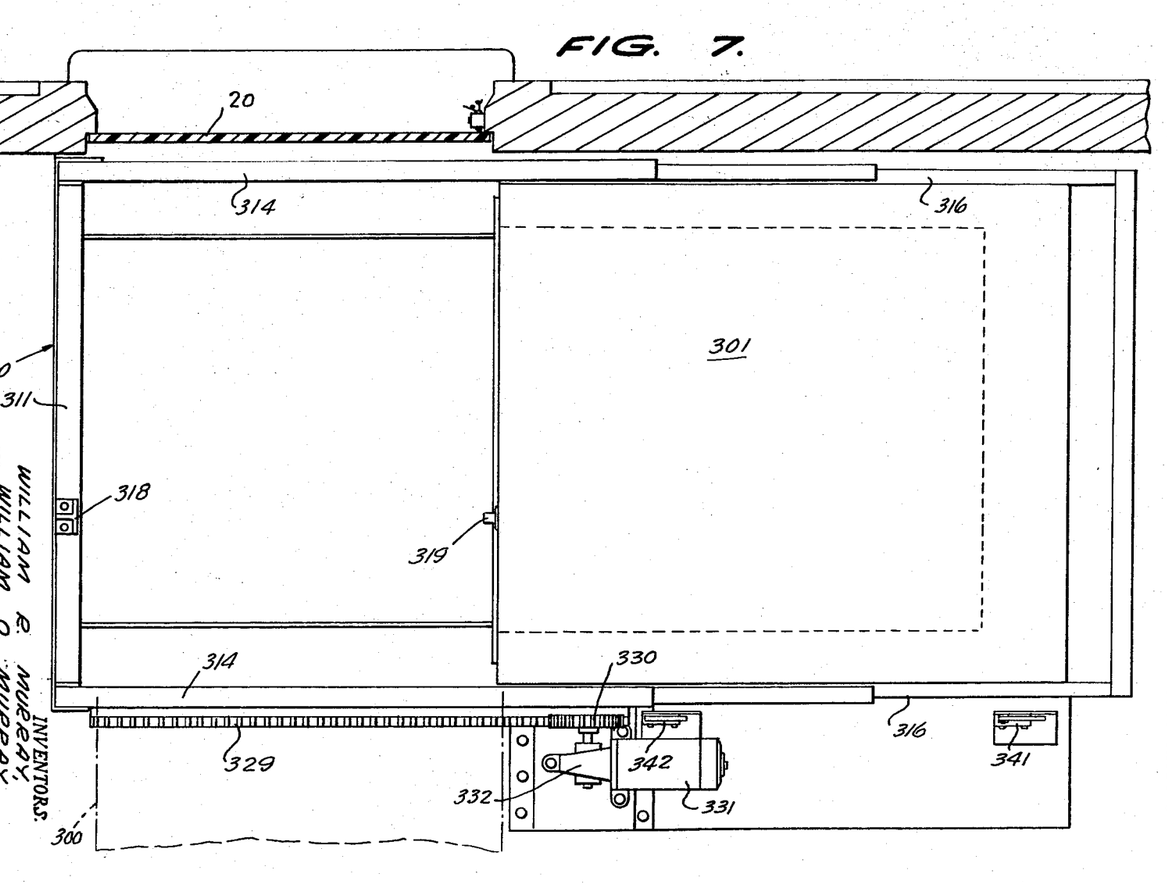
FIGURE 7 is a horizontal cross-sectional view taken substantially on the line 7—7 of FIGURE 5.

The oven 301 comprises an upstanding generally rectangular cabinet spaced forwardly, namely, to the left as viewed in FIGURE 1, from the food storage and delivery cabinet 16 and being provided with a horizontally-sliding drawer, designated generally at 310 which is extensible to a position located forwardly adjacent the lower, or discharge end of the inclined delivery paltform 300, as shown in FIGURE 7. The swinging transparent window 20 is located in longitudinal alignment with the platform 300, so that said window 20 is likewise aligned with the slding drawer 310 when the drawer is in its extended position, as is also shown in FIGURE 7. Therefore, then the drawer 310 is in its extended position, it may either receive food articles to be cooked from the delivery platform 300, or may permit a customer to remove cooked food articles therefrom through the delivery window 19 when the transparent closure panel 20 is swung inwardly in the manner illustrated in dotted view in FIGURE 4.

Figures 5, 6:
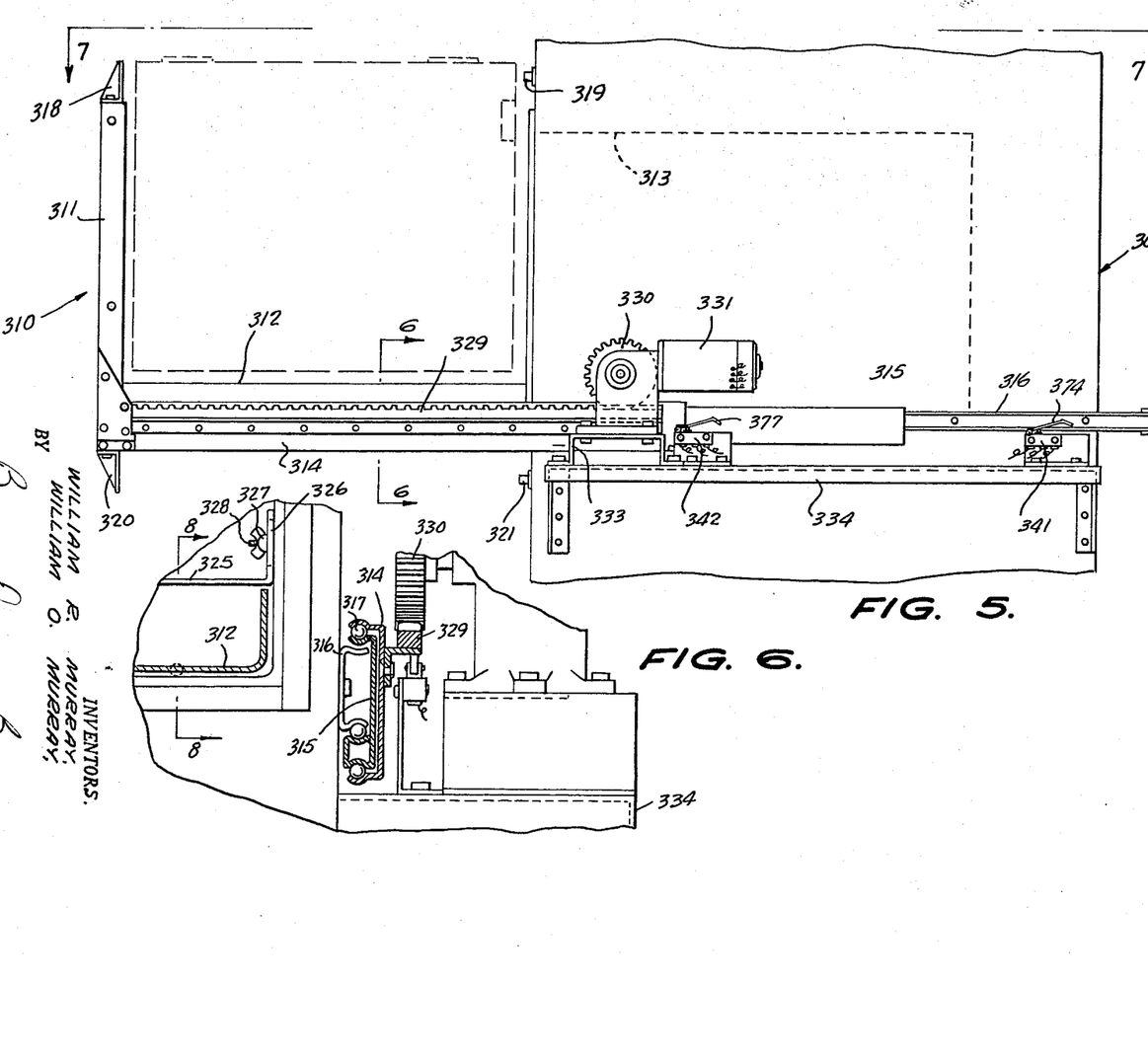
FIGURE 5 is an enlarged fragmentary transverse vertical cross-sectional view taken substantially on the line 5—5 of FIGURE 4.
FIGURE 6 is an enlarged fragmentary vertical cross-sectional view taken substantially on the line 6—6 of FIGURE 5.

The sliding drawer assembly 310 comprises a main vertical closure wall 311 to which is secured a horizontal food-receiving tray 312 movable into the cooking space 313 provided in the oven 301. Rigidly-secured to the bottom corner portions of the vertical main closure wall 311 are a pair of opposing, inwardly-facing supporting channel bars 314, 314 slidably-engaged on intermediate supporting channel bars 315 which are, in turn, slidably-engaged on respective outwardly-facing fixed channel bars 316, 316 secured to the front and rear sidewalls of the oven cabinet, as shown in FIGURES 5, 6 and 7. Thus, the channel bars 314 are telescopically slidably-engaged on the fixed supporting bars 316 by means of the intermediate channel bars 315. Suitable ball bearings 317 may be provided between the relatively slidable channel bars.

The vertical main closure wall 311 of the sliding drawer assembly is provided at its top and bottom edges with abutment brackets 318 and 320 respectively engageable with oven control switch buttons 319 and 321 mounted on the top and bottom marginal portions of the drawer aperture when the closure wall 311 has been retracted to its closed position. The control switch elements 319 and 321 are suitably-arranged in the energizing circuit of the oven so as to cause the oven to be energized automatically when the main closure member 311 has been retracted to its closed position. When the closure member 311 is in open position the associated oven control switches 319 and 321 are opened to de-energize the oven. The control switches 319 and 321 may be connected in the energizing lines associated with the oven, for example, in the manner illustrated in FIGURE 13.

The tray 312 is provided at its inner portion with rotatably-mounted bearing balls 322 engageable on the bottom wall 323 of the oven enclosure 313 so as to slidably-support tray 312 in its required horizontal position. The bearing balls 322 are formed from suitable heat-resistant material. Suitable generally spherically-shaped supporting sockets are provided for the bearing balls 322, as shown in FIGURES 8 and 9, the sockets being designated at 324.

Figure 8:
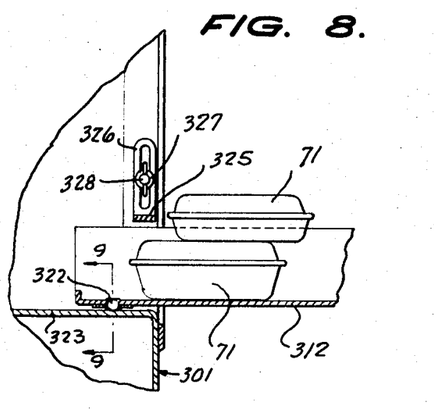
FIGURE 8 is a fragmentary vertical cross-sectional view taken substantially on the line 8—8 of FIGURE 6 and showing the manner in which food trays are deposited on the sliding shelf of the cooking oven portion of the machine.
Figure 9:
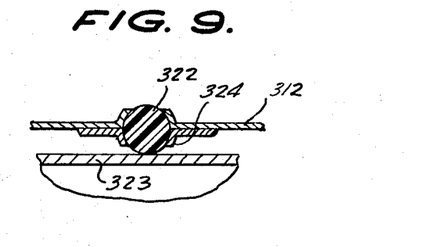
FIGURE 9 is an enlarged fragmentary vertical cross-sectional detail view taken substantially on the line 9—9 of FIGURE 8.

As shown in FIGURES 6 and 8, a generally U-shaped, transversely-extending supporting bracket member 325 is adjustably-mounted in the lower portion of the front of the oven cavity 313, the bracket 325 being provided with the slotted upstanding side arms 326 which are clampingly-engaged by wing nuts 327 threadedly-engaged in the sidewalls of the oven cavity, engaging on studs 328 extending through the vertical slots of the arms 326, whereby the bracket member 325 may be adjusted vertically. The bracket member 325 is so adjusted that it will allow only one food container or tray 71 to pass therebeneath when the oven tray 312 is retracted into the oven. Thus, when one food tray 71 is arranged on top of a subjacent food tray 71, as shown in FIGURE 8, the upper tray will be pushed off onto the oven tray 312 as the oven tray 312 is retracted inwardly into the oven cavity 313. This assures proper cooking of the contents of the food receptacles or trays 71 since only a single horizontal layer of such trays will be provided on the oven tray 312 during the cooking process.

The telescopically-related channel-shaped bar members 315 and 314 and the fixedly-mounted channel-shaped bar member 316 are conventionally-arranged to allow extension and retraction of the sliding drawer assembly 310. Thus, the horizontal channel bar 314 subjacent the inclined delivery platform 300 has secured thereon a horizontal rack bar 329 which is meshingly-engaged by a rack pinion gear 330 driven by an electric motor 331 of the reversible type through a conventional gear-reduction assembly 332. The motor 331 and its associated gear-reduction assembly 332 are unitarily mounted by means of a supporting bracket 333 on a horizontal shelf member 334 secured to the rear wall of the oven 301 and transversely underlying the inclined delivery platform 300, as is clearly shown in FIGURE 4.

Motor 331 is provided with a suitable control circuit, presently to be described, for reversibly energizing same to extend and retract the sliding drawer assembly 310, as required, for receiving food trays 71 from the inclined platform 300, for suitably-cooking the contents of the food trays, and for then moving the food trays into a position where they may be removed by a customer through the delivery window 19.

The circuitry associated with the sliding drawer-operating motor 331 is connected in a manner presently to be described across the wires 174 and 175. As above-mentioned, the wire 175 is connected to the relay contact 172, so that wire 175 is connected to line wire 125 through the relay contacts 172, 173 and the pole 171 thereof, responsive to the energization of the relay 166. The motor circuit remains energized for a period of time corresponding to the latching time of said relay 166.

A pilot lamp 28, which may be colored red, is connected in a manner to be energized responsive to the energization of the relay 166. Thus, one terminal of the winding of relay 166 is connected by the wire 162' to wire 126 and the other terminal thereof is connected by a wire 185 to the fourth stationary stepped contact 186 of another ratchet-operated switch 187 having a rotary switch arm 188 and the ratchet wheel sector 189 drivingly connected thereto. Pole 188 is connected by a wire 230 to line wire 125. As will be presently explained, relay 166 becomes energized responsive to proper coin operation of the machine, causing its pole 171 to bridge its stationary contacts 172 and 173, thereby connecting the pilot lamp 28 across the line wires 125 and 126. Lamp 28 remains energized as long as relay 166 remains latched down, namely, as long as the energizing circuits associated with the motors 48 and 331 are effective.

Connected in parallel with the operating circuits associated with the motors 48 and 341, namely, connected across the wires 174 and 175, is the control relay 182 for the oven 301, energization of the relay 182 being required in order to allow the oven to be energized. As above-mentioned, effective energization of the oven cannot occur until the door-control switches 319 and 321 are closed.

Energization of relay 182 occurs responsive to the latching-down of relay 166, since one terminal of the winding of relay 182 is connected to the wire 174 and the other terminal thereof is connected to wire 175. Wire 174 is connected to line wire 126 and wire 175 is connected to the contact 172, which is, in turn, connected to line wire 125 responsive to the energization of the relay 166.

It will be readily apparent that in order to operate a selected meat-dish conveyor 84, it is necessary to insert a number of coins in the machine corresponding to the required number of steps of the ratchet sector 150 to bring the switch arm 145 into engagement with the stationary switch contacts 143, 146 or 147 associated with the motor control relay 129 controlling the motor of the selected conveyor. Thus, four coins are required to bring switch arm 145 into engagement with the contact 143 in the typical arrangement illustrated in FIGURE 13, six coins are required to bring switch arm 145 into engagement with stationary contact 146, and eight coins are required to bring the switch arm 145 into engagement with stationary contact 147. This provides for selection of one of three different meat dishes having different prices.

As previously-mentioned, when the push-button switch 23 corresponding to the selected meat dish is actuated, the associated relay 129 becomes energized and remains energized by the establishment of a holding circuit therefor through its contacts 131, 133 and the normally closed mercury switch contacts 137, 136 leading to the line wire 125. The associated motor 86 remains energized as long as this holding circuit is intact. The conveyor operates to move its lowermost shelf element 100' downwardly, namely, to rotate said lowermost shelf element clockwise, as viewed in FIGURE 3, sufficiently to release the meat tray 71 previously supported thereby. As this occurs, the upper left tray element 100', shown in FIGURE 3, rotates clockwise, engaging and moving past the associated switch arm 116', causing the holding circuit contacts 136, 137 to open, allowing the associated control relay 129 to become de-energized. At the same time, the pole 137 engages the upper contact 183 of the associated switch 115', as viewed in FIGURE 13, momentarily connecting the line wire 125 to a wire 184, to which the respective upper switch contacts 183 of the switches 115' are connected. This energizes the ratchet release relay 154 whose winding is connected across wires 158 and 184, as shown in FIGURE 13. Energization of the release relay 154 elevates the pawl member 151 and allows spring 149 to return switch element 145 and ratchet wheel sector 150 to their starting positions, wherein they remain until the cycle of operation is repeated by the next customer.

As above-mentioned, one terminal of the latched timing relay 166 is connected by wire 162' to the line wire 126 and the other terminal of said relay is connected by the wire 185 to the fourth stationary stepped contact 186 of the ratchet-operated switch 187 having the rotary switch arm 188 and the ratchet wheel sector 189 drivingly-connected thereto. Arm 188 is biased toward the starting position thereof shown in FIGURE 14 by a coiled return spring 190, which normally holds the arm 188 in engagement with the blank first stationary contact 191' of switch 187. Ratchet sector 189 is engaged by a pawl arm 191 pivotally-connected to the plunger 192 of a ratchet solenoid 193. Also, pivotally-connected to the pawl member 191 is a plunger 194 of a ratchet release solenoid 195. One terminal of the release solenoid 195 is connected by a wire 196 to wire 185, and the other terminal thereof is connected to line wire 126. One terminal of ratchet solenoid 193 is connected to the line wire 126 and the other terminal thereof is connected to wire 184.

Each of the vegetable-conveyor motors 87 has one terminal thereof connected by a wire 197 to line wire 126. The remaining terminal of each motor 87 is connected by a wire 198 to one stationary contact 199 of a three-pole relay 200 having movable poles 201, 202 and 203. When relay 200 is energized, the movable pole 201 bridges stationary contacts 199 and 204, the contact 204 being connected through a wire 205 and the normally closed associated mercury switch 115 to line wire 125.

Also connected to wire 205 are additional stationary contacts 207 and 208 of the relay 200. When the relay 200 is energized, the pole 202 bridges the contact 207 and the cooperating stationary contact 209. Contact 209 is connected to a wire 210 which is connected through the associated product-exhaust switch 105 and one section 211 of a multiple-section push-button switch 212 to a wire 213 which is connected to one stationary contact 214 of a manually-operated selector switch 215 actuated by the knob 24. As shown in FIGURE 14, the rotary contact arm 216 of switch 215 is normally in engagement with a blank stationary contact 217, but may be manually-rotated to engage any selected one of the stationary contacts 214, in accordance with the desired selection of vegetable dishes to be dispensed. From FIGURE 14 it will be seen that the control relay 200 has one terminal thereof connected by a wire 218 to the line wire 126, and the other terminal thereof connected to wire 210.

From FIGURE 14 it will be seen that each of the motors 87 associated with the vegetable conveyors 85 is provided with a control relay 200 connected through a section 211 of the multiple-section push-button switch 212 to one of the stationary contacts 214 of selector switch 215, the circuits being similar to that above-described in connection with the first control relay 200 associated with the initial section 211 of multiple-section switch 212.

Each pole 203 of the respective relays 200 is engageable bridgingly with stationary contact 208 and a cooperating stationary contact 219 responsive to the energization of the aforesaid relay. The contacts 219 of the relays are connected to the common wire 184.

The rotary switch arm 216 of the manually-adjustable switch 215 is connected by a wire 220 through a normally closed cam-operated switch 221 to a wire 222. The second and third stepped contacts 223 and 224 of ratchet switch 187 are connected to the wire 222. Switch 221 is actuated by suitable cam means, such as a star wheel 226 drivingly-connected to ratchet sector 189 and engaging a follower arm 227 provided on the switch arm of switch 221 to open switch 221 while ratchet wheel sector 189 is in motion. Thus, switch 221 remains closed only while the ratchet sector member 189 is at rest.

As above-described, when the upper left meat shelf element 100', shown in FIGURE 3, engages the switch-operating arm 116', it opens contacts 137, 136 and momentarily closes contacts 137, 183. This applies a pulse of voltage to ratchet solenoid 193 through a circuit comprising line wire 126, the winding of solenoid 193, wire 184, contact 183, pole 137, wire 138 and line wire 125. This moves the switch pole 188 of the ratchet-operated switch 187 into engagement with stationary contact 223. This sets up a circuit whereby a selected vegetable-conveyor motor 87 may be energized by suitably-positioning the pole 216 of selector switch 215 to engage the stationary contact 214 corresponding to the desired vegetable to be dispensed. Thus, with pole 216 in engagement with a contact 214, actuation of the vegetable-delivery push button 26 simultaneously closes all the sections 211 of the multiple-section switch 212. This energizes the relay 200 associated with the motor 87 of the selected vegetable conveyor through a circuit comprising line wire 126, wire 218, the winding of the relay 200, wire 210, normally closed switch 105, the push-button section 211, wire 213, the selected switch contact 214, the arm 216, wire 220, normally closed switch 221, wire 222, contact 223, pole 188, and the wire 230 connecting pole 188 to line wire 125. Relay 200 is held closed through a holding circuit comprising line wire 126, wire 218, the winding of relay 200, wire 210, contact 209, pole 202, contact 207, wire 205, the normally closed mercury switch 115, and line wire 125. The motor 87 associated with the energized relay 200 likewise becomes energized by the bridging of the contacts 199, 204 by the relay pole 201, causing the associated vertical conveyor 85 to operate and deliver the selected vegetable dish to the conveyor belt 47, by the counterclockwise rotation of the lower shelf member 100 in FIGURE 3, as above-described. Simultaneously, the upper right shelf member 100 sweeps past and momentarily engages the switch arm 116, opening the mercury switch 115 and releasing the relay 200, causing the motor 87 to become de-energized.

The previous energization of the relay 200 causes the contacts 219 and 208 to be bridged by the pole 203 of the relay, connecting wire 184 to line wire 125 through the switch 115, causing the ratchet solenoid 193 to be again energized. This moves the arm 188 through a second step, bringing it into engagement with the contact 224. This places the system in a condition for a further selection of a vegetable dish to be dispensed. The selection is made by operating knob 24 to move the arm 216 into engagement with another stationary contact 214, in the circuit of the relay 200 corresponding to the selected second vegetable. The second vegetable dish is delivered by again actuating the push button 26, causing the conveyor motor 87 of the conveyor containing the desired second vegetable to become energized and to deliver the second vegetable onto the moving conveyor belt 47. The second selected vegetable conveyor motor remains energized until its associated mercury switch 115 opens.

The energization of the second vegetable conveyor relay 200, as above-described, causes its contacts 208, 219 to be bridged by its pole 203, again connecting the wire 184 to the line wire 125 through the limit switch contacts 115 of the associated circuit for the conveyor motor 87. This delivers a third voltage pulse to the ratchet solenoid 193, causing the arm 188 to be advanced through a third step into engagement with the stationary contact 186. Thus, substantially simultaneously with the second actuation of the vegetable tray-delivery push button 26, the wire 185 is connected to line wire 125 through the contact 186, pole 188 and wire 230. This energizes the latched timing relay 166 through a circuit comprising wire 185, the winding of relay 166, wire 162' and line wire 126. Relay 166 remains energized only momentarily, namely, only until pawl 191 disengages from ratchet sector 189, but the relay 166 remains latched-down for a predetermined period of time. When the pole 171 of relay 166 bridges contacts 172 and 173, conveyor motor 48 and the operating circuit for the sliding drawer-operating motor 331 become energized, and likewise the oven-control relay 182 becomes energized. Conveyor belt 47 begins to move and the selected partially-cooked food articles are conveyed thereby to the inclined oven-delivery platform 300 in the manner above-described for delivery to the oven and for cooking therein, and for ultimate positioning for removal by a customer through the window 19.

At the end of its latching time, the contact mechanism of relay 166 releases, opening the energizing circuit of motors 48 and 331, and of relay 182, by the disengagement of pole 171 from contacts 172 and 173. Pole 163 moves into engagement with contacts 164 and 165, connecting wire 162 to line wire 125, so that the green pilot lamp 27 becomes energized, showing the completion of the delivery cycle and the restoration of the starting conditions.

Simultaneously with the energization of the latched timing relay 166, the release solenoid 195 is energized, since the wire 196 is connected to the line wire 125 through cantact 186, switch arm 188, and wire 230. This releases the sector element 189, allowing the spring 190 to return arm 188 rapidly to its starting position. The follower arm 227 is sufficiently damped frictionally, or by other suitable means, so that the relatively rapid rotation of the star wheel 226 keeps switch 221 open until the switch arm 188 has returned to its starting position, namely, to the position wherein it engages with the blank stationary contact 191'.

The sliding drawer-operating motor 331 is of conventional design and comprises a reversible motor having a forward winding 343 and an additional reversing winding 344. One terminal of the forward winding 343 is connected by a wire 355 to the pole 354. The other terminal of winding 343 is connected by a wire 346 to one pole 347 of a three-pole relay 348. The relay 348 has two other poles 349 and 354. The poles 349, 347 and 354 are respectively engageable with stationary contacts 350, 351 and 352. When the relay 348 is energized, the poles 349, 347 and 354 are moved into contact with the three opposite stationary contacts 350, 351 and 352.

One terminal of the reversing winding 344 is connected by a wire 355 to the pole 354. The other terminal of winding 344 is connected by a wire 356 to a pole 357 of another three-pole relay 358. The relay 358 has two additional poles 363 and 364. The poles 363, 357 and 364 are respectively engageable with three stationary contacts 360, 361 and 362. When the relay 358 is energized, the poles 363, 357 and 364 are moved into contact with the three opposite stationary contacts 360, 361 and 362. Pole 363 is connected by a wire 365 to the wire 355.

One terminal of each of the windings of the relays 348 and 358 is connected to the wire 174. The other terminal of the winding of relay 348 is connected through a wire 366 and a normally open timed switch 367 to the wire 125. The timing motor of timed switch 367 has one terminal thereof connected to the wire 174 and the other terminal thereof connected by a wire 368 to the stationary contact 172 of relay 166. When the timing motor of the timed switch 367 is energized, the contacts thereof close after a predetermined period of time, for example, after one minute.

As above-stated, one terminal of the winding of the relay 358 is connected to the wire 174. The other terminal thereof is connected through a wire 369 and the contacts of a second timed switch 370 to the wire 125. One terminal of the operating motor of timed switch 370 is connected to the wire 174. The other terminal of said operating motor is connected by a wire 371 to a pole 372 of a first microswitch assembly 341 located on the shelf member 334 in a position to be operatively-engaged by the rear end portion of rack bar 329 when the drawer assembly 310 has moved to a substantially closed position.

The microswitch assembly 341 comprises a first pole 372 which is engageable with a contact 373 when the operating element 374 of the microswitch assembly is engaged by the rack bar 329, as above-described. The microswitch assembly 341 has a second pole 375 electrically-connected to contact 373 and normally engaging another fixed contact 376. Pole 375 is disengaged from contact 376 when the operating element 374 of the microswitch is engaged by the rack bar 329, namely, when the drawer assembly is moved to substantially closed position.

Designated at 342 is a second microswitch assembly located adjacent the path of movement of the rack bar 329 and having an operating element 377 located in the path of movement of the rear end of rack bar 329 so as to be operatively-engaged thereby as soon as the rack bar moves rearwardly from the fully-opened position of the drawer assembly 310. As will be apparent from FIGURE 5, element 377 remains in engagement with the rack bar 329 until the drawer assembly is returned to its fully-opened position, shown in FIGURE 5. Thus, during the major portion of the rearward and forward travel of the drawer assembly 310 element 377 is operatively-engaged by the rack bar, for a purpose presently to be described. The microswitch assembly 342 is provided with respective poles 378 and 379, the pole 378 normally engaging a stationary contact 380, but being disengaged therefrom when the operating element 377 is engaged by rack bar 329, and the pole 379 being normally disengaged from a stationary contact 381, but engaging therewith when operating element 377 is engaged by rack bar 329.

As shown, pole 379 is electrically-connected to contact 380. Contacts 380 and 373 are connected together by a common wire 382 which is, in turn, connected to the line wire 125. Stationary contact 376 of microswitch assembly 341 is connected by a wire 383 to the upper relay contact 350, and stationary contact 381 of the microswitch assembly 342 is connected by a wire 384 to the upper contact 362 of relay 358. Upper contact 361 of relay 358 is connected by a wire 385 to wire 346, and upper contact 352 of relay 348 is connected by a wire 386 to wire 356. Upper relay contacts 360 and 351 are connected by wires 387 and 388 to the wire 382. Pole 349 is connected by a wire 394 to wire 366. Pole 364 of relay 358 is connected by a wire 395 to wire 369.

The timing switch device 370 is of conventional design and is arranged to close its contacts a predetermined period of time after its motor element becomes energized, for example, after a period of 3 minutes.

When the latching relay 166 becomes energized, in the manner above-described, the pole 171 thereof bridges contacts 172 and 173. This energizes the timing motor of the timed switch 367 by a circuit comprising wire 126, wire 174, the timing motor, wire 368, relay contact 172, pole 171, relay contact 173, wire 167 and line wire 125. After the delay period of the assembly 367, for example, one minute, its contacts close, causing the relay 348 to be energized through a circuit comprising line wire 125, the contacts of the timed switch 367, wire 366, the winding of relay 348, wire 174 and line wire 126. The poles of relay 348 engage their respective contacts, and the relay is held closed by a holding circuit shunting the contacts of timed switch assembly 367 and comprising wire 394, relay contacts 349–350, wire 383, limit switch contacts 375–376, wire 382 and line wire 125.

The closure of relay contacts 347–351 energizes the "forward" motor winding 343 by a circuit comprising line wire 126, wire 174, wire 345, the "forward" winding 343, wire 346, relay contacts 347–351, wire 388, wire 382 and line wire 125. At the same time, the reversing winding 344 is shunted by a circuit comprising wire 356, wire 386, relay contacts 352–354, and wire 355. This energizes the motor 331 in the forward direction and causes the drawer assembly 310 to move inwardly, along with the food items received thereby from the delivery ramp 300. Rack bar 329 engages microswitch operating elements 377, causing contacts 379–381 to close and contacts 378–380 to open, as above-described.

When the drawer assembly 310 completes its inward movement, the operating element 374 of microswitch assembly 341 is engaged by the rear end of rack bar 329, causing contacts 375–376 to open and causing contacts 372–373 to close. The opening of contacts 375–376 opens the above-described holding circuit for relay 348 (the time switch assembly 367 having meanwhile outrun its period of switch-closure and its contacts being, therefore, open) so that the relay 348 becomes de-energized, opening the energizing circuit of the "forward" motor winding 343 at the contacts 347–351.

The closure of limit switch contacts 372–373 energizes the motor of the timed switch assembly 370, so that after a predetermined time, for example, 3 minutes, the contacts of the timed switch assembly 370 closes. The time delay provided by the assembly 370 is such as is required for the cooking of the food items.

The closure of the contacts of the timed switch assembly 370 energizes the relay 358 through a circuit comprising line wire 125, the contacts of timed switch assembly 370, wire 369, the winding of relay 358, wire 174 and line wire 126. Relay 358 closes its contacts, establishing a holding circuit therefor shunting the contacts of timed switch assembly 370 through a circuit comprising wire 395, relay contacts 364–362, wire 384, limit switch contacts 379–381, wire 382, and line wire 125. The closure of the contacts of relay 358 energizes the reverse-operating circuit of motor 331 through a circuit comprising line wire 126, wire 174, wire 345, the first motor winding 343, wire 346, wire 385, relay contacts 361–357, wire 356, the motor-reversing winding 344, wire 355, wire 365, relay contacts 363–360, wire 387, wire 382, and line wire 125. With the motor-reversing circuit thus energized, the drawer assembly 310 moves outwardly, toward the position thereof shown in FIGURE 5. When the rack bar 329 disengages from the microswitch-operating element 377, microswitch contacts 379–381 open, interrupting the holding circuit of relay 358 (the timed switch assembly 370 having meanwhile re-set itself to its starting position with its contacts open, resulting from the opening of the microswitch contacts 372–373), whereby the relay 358 becomes de-energized, and whereby the motor-reversing circuit becomes opened at the relay contacts 357–361 and 363–360. As the limit-switch contacts 379–381 open as the result of the movement of the drawer assembly 310 outwardly to its substantially fully-opened position, the limit-switch contacts 378–380 close, energizing the "reject" device 169 through a circuit comprising line wire 126, wire 159, the "reject" device 169, a wire 390, limit-switch pole 378, limit-switch contact 380, wire 382, and line wire 125.

The conventional timed-switch device 367 re-sets itself to zero when it becomes de-energized at the end of the latching period of the latching relay 166 by the opening of the latched relay contacts 172–171–173.

In operation, the customer inserts the proper number of coins in the manner above-described, employing the coin-receiving device 22 to receive the coins and actuating the device successively, whereby to close the coin-control switch 161 once for each coin and thereby to successively energize the ratchet relay 153 to the required number of steps corresponding to the selected meat article. This brings the switch arm 145 into engagement with the corresponding contact 143, 146 or 147, as above-described. The customer then actuates the push-button switch 23, corresponding to the selected meat article, which accordingly energizes the associated relay 129 and simultaneously energizes the associated meat dish-conveyor motor 86, driving the associated meat conveyor through one step, which causes the operation of the associated limit switch 115'. Operation of said limit switch de-energizes the conveyor motor and also opens the holding circuit for the relay.

As above-described, operation of the limit switch 115' energizes the release relay 154, releasing the ratchet sector 150 so that the switch arm 145 returns to its starting position. At the same time, the vegetable dish ratchet relay 193 is energized, momentarily, moving the ratchet sector 189 through one step, and causing its associated switch arm 188 to move into engagement with the contact 223, as above-described. The customer then sets the vegetable-selector knob 24 so as to move the switch arm 216 into engagement with a selected stationary contact 214, corresponding to a first desired vegetable dish, after which the customer actuates the vegetable-delivery-pushbutton 26, closing the contacts of the multiple switch 212. This energizes the relay 200 corresponding to the selected vegetable dish, which simultaneously energizes the associated vegetable-conveyor motor 87. After the conveyor has operated through one step, delivering a vegetable dish onto the belt 47, the limit switch 115 opens, deenergizing the relay 200 of the motor 87. The previous energization of the relay 200 moves the ratchet sector 189 through another step, since the ratchet relay 193 receives a pulse of voltage. Thus, arm 188 is in engagement with stationary contact 224, thus preparing the circuit for delivery of the second selected vegetable dish. The customer then operates the selector knob 24 to move the switch arm 216 into engagement with another stationary contact 214, in circuit with the control relay associated with the second desired vegetable dish. Thereupon the customer operates the pushbutton 26 to close the multiple switch unit 212, which causes energization of the relay 200 associated with the circuit of the vegetable-conveyor motor 87 corresponding to the second vegetable dish choice. Said last-named conveyor motor operates through one step until its associated limit switch 115 opens, de-energizing its control relay 200. During the energization of said control relay the ratchet relay 193 is again pulsed, advancing the ratchet wheel sector 189 through a further step so that switch arm 188 engages stationary contact 186.

When switch arm 188 moves into contact with stationary contact element 186, the latched relay 166 is energized, moving pole 171 into bridging contact with stationary contact elements 172 and 173, as above-described, which energizes the conveyor motor 48, the control relay 182 for oven 301, and the timed switch device 367 associated with the sliding-drawer assembly 310. The selected meat and vegetable dishes are then transported by the conveyor belt 47 moving to the left, as viewed in FIGURE 4, the selected trays of food being deposited by the left-end portion of the top run of belt 47 onto the inclined delivery platform or ramp 300, which delivers the trays of food onto the oven tray 312. The oven-drawer assembly 310 then goes through its cycle of closing and opening, as above-described, during which the food articles are completely cooked. As above-explained, the bracket member 325 assures that all of the trays 71 will be deposited on the bottom wall of the oven tray 312, as illustrated in FIGURE 8.

When the drawer assembly 310 is returned to its fully-opened position, shown in FIGURE 5, with the completely cooked food articles, said articles may be removed by the customer by swinging the transparent door 20 inwardly, for example, to the dotted-view position thereof shown in FIGURE 4, thereby providing access to the cooked food articles and permitting said cooked food articles to be withdrawn through the delivery window 19.

Meanwhile, the release relay 195 has been energized, resulting from the engagement of switch pole 188 with stationary contact 186, which elevates pawl 191, releasing the ratchet wheel section 189 so that switch arm 188 is returned to its starting position in engagement with the stationary contact 191', as shown in FIGURE 14. After the latching time period of the relay 166, pole 171 disengages from contacts 172 and 173, de-energizing the conveyor motor 48 and the motor of the timing device 367, as well as the oven-control relay 182. Pole 163 then moves into engagement with stationary contacts 164 and 165, setting up the apparatus for a new cycle of operation.

It will be noted that conveyor motor 48, relay 182 and the timed switch device 367 remain de-energized until the second vegetable dish has been deposited on the conveyor belt 47, the movement of the second selected vegetable dish onto the conveyor belt taking place substantially simultaneously with the movement of the switch arm 188 into engagement with its final contact 186. Thus, movement of the belt conveyor 44 does not commence until the selected meat and vegetable trays have been deposited on the top run of conveyor belt 47 in position for movement onto the inclined delivery ramp 300 leading to the extended oven tray 312.

Respective pilot lamps 25 are connected between contacts 143, 146, 147 and line wire 126, said pilot lamps being mounted on panel 21 adjacent the meat-selecting push buttons 23. A lamp 25 becomes illuminated when the proper number of coins, corresponding to the desired meat dish, have been deposited in the machine, and also indicates the proper meat-selecting button 23 to push.

The meat and food articles stored in the cabinet 16 are pre-cooked, preferably, to a degree such that cooking thereof can be completed by maintaining them in the oven cavity 313 for the period of time provided by the timed switch device 370, for example, a cooking time of the order of 3-minutes.

With suitable minor modifications, the food-dispensing machine above-described may be used to vend food products that are packaged, but not cooked, such as table eggs in cartons. "Take-out" dinners can be cooked in packages and can then be dispensed from the vending machine, for example, may be placed on suitable insulated dinner plates to keep the food warm for several hours. Thus, the machine can be employed either with or without the oven assembly 301.

Also, the vending machine can be easily modified by adding additional sections thereto or by removing sections therefrom, with corresponding changes in the length of the main conveyor belt assembly 44.

The timed switch devices 367 and 370 are of conventional construction, as above-stated, and are provided with means for variably selecting the switch closure delay periods thereof. Thus, the switch device 367 may be adjusted to close its contacts after a 1-minute period of energization of its operating motor, or any other desired delay period, and similarly, the timer 370 may be adjusted to close its contacts after a 3-minute period following the energization of its operating motor, or any other desired cooking period, in accordance with the needed cooking time for the food articles dispensed by the machine.

While a specific embodiment of an improved food article-dispensing machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A food article-dispensing machine comprising an oven having horizontally-reciprocable food article-receiving sliding tray means, means to at times moves said sliding tray means to an outwardly-extending position, conveyor means located to deliver food articles to said sliding tray means, means to activate said conveyor means, means to retract said sliding tray means into said oven for a predetermined period of time responsive to the activation of said conveyor means, and means to return said sliding tray means to an outwardly-extending position at the expiration of said predetermined period of time.

2. The food article-dispensing machine of claim 1, and wherein said conveyor means comprises a plurality of individual conveyors and means to activate said individual conveyors in sequence, and wherein said means to retract said sliding tray means is responsive to the actuation of the last individual conveyor in said sequence.

3. The food article-dispensing machine of claim 1, and wherein said conveyor means comprises a first group of vertical conveyors adapted to deliver food articles of one class, a second group of vertical conveyors adapted to deliver food articles of a second class, means to selectively actuate said first group of vertical conveyors, and means to actuate the second group of vertical conveyors following the actuation of a selected conveyor of said first group, and wherein the means to retract said sliding tray means is responsive to the actuation of the last vertical conveyor.

4. The food article-dispensing machine of claim 3, and wherein the means to selectively actuate said first group of vertical conveyors includes a coin-controlled switch provided with coin-receiving means and means to close said switch once for each coin deposited, and means to select one of said first group of vertical conveyors for actuation in accordance with the number of times said coin-controlled switch closes.

5. The food article-dispensing machine of claim 4, and wherein the first group of vertical conveyors is provided with respective drive motors, a source of current, and a multiple-position selecting switch connected between said drive motors and said source of current, and wherein said selecting means comprises an electromagnetic stepping device drivingly-connected to said selecting switch and circuit means connecting said stepping device to said source of current through said coin-controlled switch.

6. The food article-dispensing machine of claim 5, and wherein the second group of vertical conveyors is also provided with respective drive motors and a second multiple-position selecting switch and circuit means connecting said second selecting switch between said last-named drive motors and said source of current.

7. The food article-dispensing machine of claim 6, and wherein said last-named circuit means includes a third multiple-position switch, electromagnetic drive means operatively-connected to said third multiple-position switch, and means to energize said electromagnetic drive means responsive to the operation of said selected conveyor of the first group.

8. The food article-dispensing machine of claim 7, and wherein said conveyor means includes a horizontal conveyor located to receive food articles from said vertical conveyors, said horizontal conveyor being provided with a driving motor, and wherein said means to activate said conveyor means includes a control relay having contacts connected between said source and said last-named driving motor, and means to connect said control relay to said source responsive to a predetermined number of steps of operation of said third multiple-position switch.

9. The food article-dispensing machine of claim 8, and wherein said control relay is of the timed-latching type wherein said contacts remain closed a timed period following momentary energization of the relay, and means to open the connection of said control relay to the source immediately following a predetermined number of steps of operation of said third multiple-position switch.

10. The food article-dispensing machine of claim 9, and wherein said control relay is provided with additional contacts which are normally closed and which are opened when the control relay is in latched condition, said additional contacts being connected in series with said coin-controlled switch.

11. The food article-dispensing machine of claim 5, and wherein said electromagnetic stepping device comprises a solenoid having a movable plunger, a rotatable ratchet member, and a pawl member connected to said plunger and drivingly-engaging said ratchet member.

12. The food article-dispensing machine of claim 5, and wherein the selecting switch is provided with means biasing it toward a starting position, and means disengaging the pawl member from the ratchet member responsive to operation of the selected vertical conveyor of said first group through a delivery step, whereby to allow the selecting switch to return to said starting position.

13. The food article-dispensing machine of claim 12, and wherein said disengaging means comprises a release solenoid operatively-connected to said pawl member, switch means closing responsive to the operation of said selected vertical conveyor through said delivery step, and circuit means connecting said release solenoid to said source through said last-named switch means.

14. The food article-dispensing machine of claim 6, and wherein said second multiple-position selecting switch is manually-operated.

15. The food article-dispensing machine of claim 8, and means to return said third multiple-position switch to its starting position responsive to the completion thereof of said predetermined number of steps of operation.

16. The food article-dispensing machine of claim 15, and wherein said third multiple-position switch has at least three steps of operation, and wherein said return means is activated responsive to the third step of operation of said third multiple-position switch.

17. The food article-dispensing machine of claim 16, and wherein said second multiple-position selecting switch is manually-operated, and circuit means including said second multiple-position selecting switch to connect a drive motor for a selected one of the second group of vertical conveyors to said source of current responsive to the actuation of said third multiple-position switch through either of its first two steps of operation.

18. The food article-dispensing machine of claim 3, and a housing surrounding said first and second group of vertical conveyors, means to circulate air through said housing, and means to refrigerate the circulating air.

19. The food article-dispensing machine of claim 1, and wherein said conveyor means includes a substantially horizontal conveyor belt, and a downwardly-inclined transfer plate mounted adjacent the discharge end of said conveyor belt and extending adjacent said sliding tray means.

20. The food article-dispensing machine of claim 2, and wherein the means to retract and return said sliding tray means comprises a reversible electric motor drivingly-coupled to said sliding tray means, means to energize said motor to operate in a direction to retract said sliding tray means responsive to the actuation of said last individual conveyor, and means to energize said motor in a direction to return said sliding tray means to said outwardly-extending position responsive to the retention of said sliding tray means in its retracted position for a predetermined period of time.

21. The food article-dispensing machine of claim 1, and wherein said conveyor means includes a substantially horizontal conveyor belt, respective groups of vertical conveyors located above and on opposite sides of the conveyor belt, and respective inclined guide members extending downwardly and inwardly from the lower portions of said vertical conveyors and terminating immediately above opposite side marginal portions of said conveyor belt.

22. The food article-dispensing machine of claim 20, and means to provide a time delay between the actuation of said last individual conveyor and the energization of said motor.

23. The food article-dispensing machine of claim 22, and wherein said time-delay means comprises a timed switch, an energizing circuit including said timed switch connected to said motor, and means to start operation of said timed switch responsive to the operation of said last individual conveyor.

24. The food article-dispensing machine of claim 23, and wherein said motor has a reverse-operating circuit and wherein said means to energize said motor in a direction to return said sliding tray means to said outwardly-extending position comprises a second timed switch, an energizing circuit including said second timed switch connected to said reverse-operating circuit, and means to start operation of said second timed switch responsive to the movement of said sliding tray means to its retracted position.

References Cited

UNITED STATES PATENTS

| | | | |
|---|---|---|---|
| 1,694,762 | 12/1928 | Ackerman | 99—335 |
| 2,274,190 | 2/1942 | Cramer. | |
| 2,501,712 | 3/1950 | Chooziesner | 99—357 |
| 2,965,015 | 12/1960 | Huchok. | |
| 3,233,536 | 2/1966 | Ignelzi | 99—357 |
| 3,335,656 | 8/1967 | Smith | 99—357 |

BILLY J. WILHITE, *Primary Examiner.*